United States Patent [19]

Gitin

[11] Patent Number: 5,406,060
[45] Date of Patent: Apr. 11, 1995

[54] BAR CODE READER FOR SENSING AT AN ACUTE ANGLE

[75] Inventor: Mark M. Gitin, Valley Cottage, N.Y.

[73] Assignee: Opticon Inc., Orangeburg, N.Y.

[21] Appl. No.: 58,025

[22] Filed: May 6, 1993

[51] Int. Cl.$^6$ .............................................. G06K 7/10
[52] U.S. Cl. ...................................... 235/462; 235/467
[58] Field of Search ........................ 235/462, 467, 472

[56] References Cited

U.S. PATENT DOCUMENTS

| | | | |
|---|---|---|---|
| 4,034,230 | 7/1977 | Brill | 250/566 |
| 4,538,060 | 8/1985 | Sakai | 235/472 |
| 4,585,931 | 4/1986 | Duncan | 235/464 |
| 4,818,847 | 4/1989 | Hara | 235/455 |
| 5,010,241 | 4/1991 | Butterworth | 235/462 |
| 5,149,948 | 9/1992 | Chisholm | 235/462 |
| 5,166,820 | 11/1992 | Fujita | 359/211 |

*Primary Examiner*—Donald Hajec
*Assistant Examiner*—Karl D. Frech
*Attorney, Agent, or Firm*—Henry Schanzer

[57] ABSTRACT

Apparatus for illuminating a bar code at a relatively shallow (i.e., acute) angle, and for sensing the light reflected from the surface at the shallow angle. In one embodiment the apparatus is used to illuminate the data bars at an acute angle along their length. Viewing the illuminated area at an acute angle, equal to the acute angle of incidence, increases the area being viewed and tends to spatially integrate the non-uniformity of the data bars. Apparatus embodying the invention is particularly useful for reading bar codes formed on a highly reflective surface. The shallow angle of illumination increases the contrast between the surrounding surface and the "data bars" of the bar code as it increases the effective area being viewed and enables the bar code to be read more accurately. In some embodiments a laser light spot is swept at an acute angle across a bar code and the light reflected from the bar code is viewed at the acute angle.

12 Claims, 10 Drawing Sheets 5,406,060

BAR CODE READER FOR SENSING AT AN ACUTE ANGLE

BACKGROUND OF THE INVENTION

This invention relates to means and methods for reading bar code data formed on a highly reflective surface and/or where the width of the bars of the bar code vary widely along the length of the bars and/or where there is very little apparent contrast between the "bars" of a bar code and the surrounding space.

Bar code readers are used to sense the light reflected from a bar code, where the bar code normally includes a series of parallel black bars of different widths and spacing formed on a white background (or, vice versa, white bars formed on a black background). Typically, when the bar code is illuminated, the white or lightly colored regions reflect a large portion, if not all, of the incident light while the black bars absorb a large portion, if not at all, of the incident light. The resulting differences (contrast) in the levels of light reflected from the bar code enables the bar code to be read visually or sensed electronically.

However, a problem exists where the bar code is formed on a highly reflective surface, such as the top side of a silicon wafer which is highly polished and functions like a mirror. Light incident on the wafer surface in a normal direction is fully reflected since the surface acts like a mirror and light incident on the "data bars" formed on the silicon surface is also reflected with little attenuation, as shown for the depressed area 12 in FIG. 1A. Consequently, there is little contrast between the light reflected from the bars and the light reflected from the surrounding area. Hence, it is very difficult to read or sense the bar code. Furthermore, the high reflectivity levels from the bars and the surrounding area cause the photosensors to saturate and the bar code information to be lost.

The problem of reading bar codes formed on a highly reflective surface, such as silicon wafers, may be better understood by noting that the bar codes present on the wafer surface may be produced by forming holes (i.e., 12 in FIG. 1A) in the wafer surface by means of a laser or other appropriate hole forming means. Each "data bar" of a bar code to be sensed, as shown in FIG. 1B, is actually formed of a series of circular holes formed along a line rather than a well defined rectangular shape. The circular holes are formed of, and within, the silicon material and light incident in the normal direction (i.e., perpendicular) to the silicon surface will be reflected from the hole surface (which is reflective) without significant attenuation. Hence, as noted above, when viewed from a "normal" direction there is minimal contrast between the "data bar" (i.e., a hole or damage caused to the surface of the silicon wafer) and the surrounding space.

Another problem is that the data bar may be formed with circular holes at various densities ranging from circles with considerable overlap to a condition where there is some space between circular holes. Consequently, the data bars do not have a uniform width in a direction perpendicular to the length of the data bar, as is normally the case with typical bar codes. This should be evident from an examination of FIG. 1B which shows a very small cross-section at the point (X1—X1) of tangency or abutment and a substantially greater cross-section along the midpoint (X2—X2) of each circular hole. To accurately decode the presence of bar code data the data bar must have some minimum width. Also, the information contained in bar codes is often a function of the ratio of the width of the "data" bars to the space between the data bars. Where the width of the data bar varies considerably along its length, reading the data bars perpendicular to their length will produce different results depending where along the length of the bar the reading is taken (or made); (i.e., readings are position dependent). Hence, where the width of a data bar varies greatly along its length, reading a "data bar" in a conventional manner (i.e., in a direction perpendicular to the bar) makes the accurate decoding of a bar code difficult.

The problems discussed above are significantly reduced in systems embodying the invention.

SUMMARY OF THE INVENTION

Applicants' invention resides in part in the recognition that reading a bar code formed on a highly reflective surface, such as a silicon wafer, by sensing the reflected light normal (or close to normal) to the reflective surface is problematic. Rather, Applicants recognized that the bar code formed on a highly reflective surface should be illuminated at a relatively shallow (i.e., acute) angle to increase the contrast between the surrounding surface and the "bar" code. Applicants further recognized that viewing the bar codes at an acute angle increases the area of the bar codes being viewed. Increasing the area being viewed compensates for the decreased amount of light being collected by the viewing sensor and enables the bar code to be read more easily and accurately.

Viewing at an angle is advantageous whether the viewing sensor is a CCD array or any other type of photodetector and whether the light source illuminating the bar code is a diffused light source or a coherent laser light source. Applicants recognized the advantage of reading a bar code, at an acute angle, along the length of the bar (longitudinally rather than transversely), independent of the surface being reflective or non-reflective. Reading a "data bar" along the length of the bar at an acute angle increases the longitudinal viewing area and therefore tends to spatially average out the non-uniformities of the data bar due to the irregular cross-section of the data bar; e.g. circular (or bullet) holes.

Applicants' invention also resides in the means for illuminating a bar code at an acute angle and in the means for sensing the reflected light.

BRIEF DESCRIPTION OF THE DRAWING

In the accompanying figures like reference characteristics denote like components.

DETAILED DESCRIPTION OF THE INVENTION

Figure 1A:
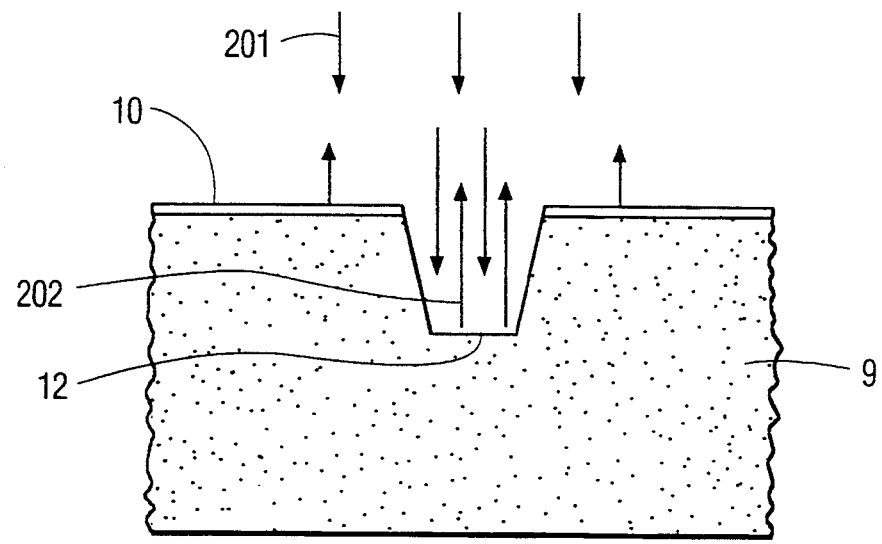
FIG. 1A is a diagram showing the projection of a beam of light, normal to a reflective surface and its reflection.
Figure 1B:
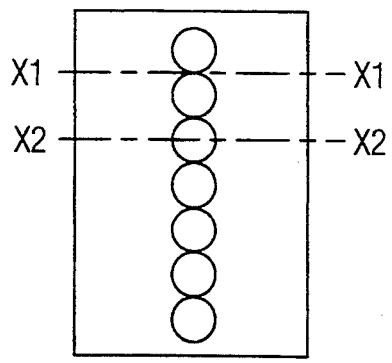
FIG. 1B is a diagram of circular holes used to form a "data bar"
Figure 1C:
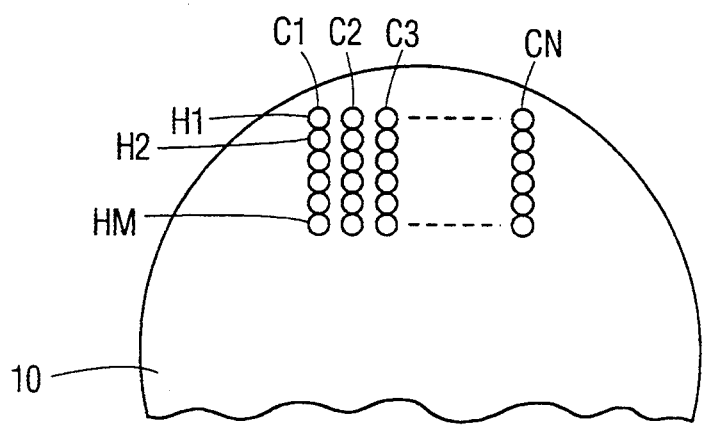
FIG. 1C is a top view of a portion of a silicon wafer illustrating a typical bar code to be read.

FIG. 1C shows a top view of a portion of a silicon wafer surface 10 on which a bar code is formed. The bar code includes a series of parallel data bars or columns (C1 through CN) with each data bar being defined by means of a series of dots or holes (H1 through HM) formed in the surface of the wafer. By way of example, in one wafer of interest there was formed at least 32 "data bars" to represent 8 characters with 4 bars per character. Each "data bar" when present, was formed by means of a series string of dots or holes to represent the bar. The holes defining a data bar may be formed by directing a laser beam onto the wafer and indenting the surface to produce the size hole and depth desired. Alternatively, the holes may be chemically etched into the surface or be formed by any other suitable means. The diameter and the depth of the holes may vary over a wide range. In a particular example the diameter of each hole was approximately 100 microns. The holes may range in depth from approximately 70 microns which defines what is referred to in the industry as a "hard mark" to a depth of approximately 5 microns to form what is termed in the industry as a "soft mark".

FIG. 1A, as discussed above, shows that a light beam, 201, from a light source (not shown) incident in a normal or perpendicular direction (at 90 degrees or close to it) to a highly polished surface 10 or to a "hole" or "damaged" area, 12, will be reflected as a beam, 202, with virtually no loss of signal regardless of whether the light falls on the surface 10 of the wafer or on the hole 12 formed in the surface of the wafer.

Figure 2A:
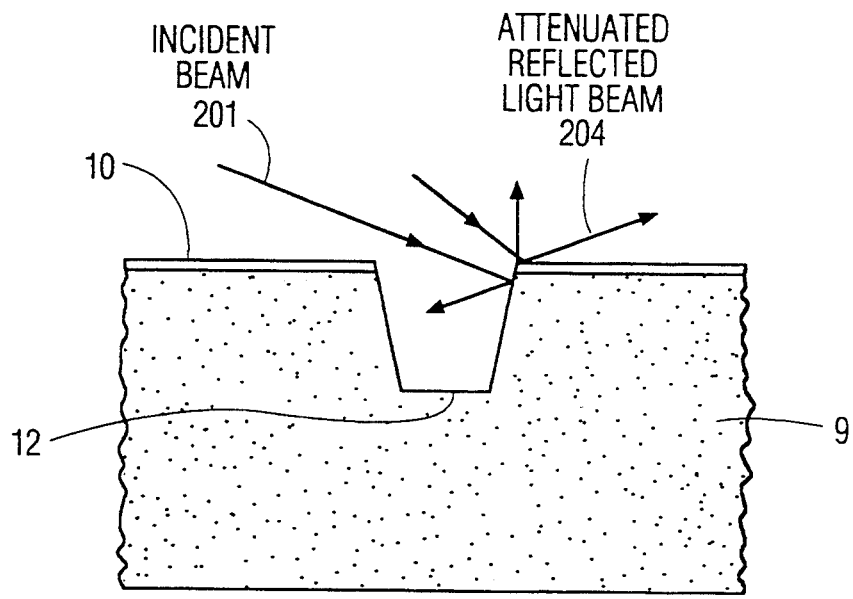
FIGS. 2A and 2C are diagrams showing the projection of a beam of light, at an angle, onto a "hole" or "damaged" portion of a polished surface, and its reflection.

FIG. 2A shows that a light beam 201 incident at an acute angle on a portion of the surface 10 in which a hole 12 has been formed undergoes scattering, whereby some of the incident light falling on the hole area will be scattered or blocked and only a portion of the incident light (i.e., light beam 204) will be reflected at an acute angle, equal to the angle of incidence, towards a sensor.

Figure 2B:
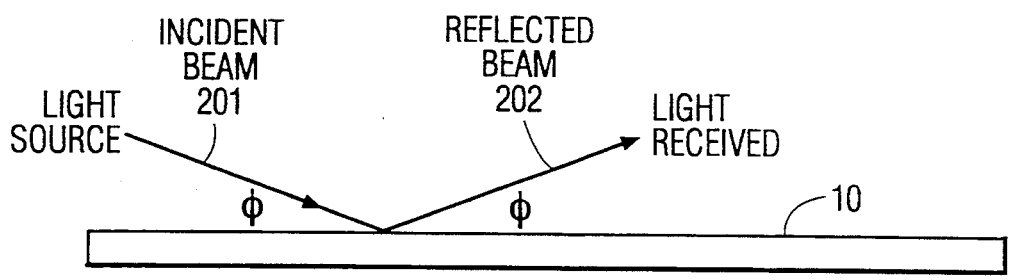
FIG. 2B is a diagram showing the projection of a beam of light, at an angle, on a smooth polished surface and its reflection.

FIG. 2B shows that a light beam 201 incident on a smooth mirror like surface 10 at an acute angle PHI ($\phi$) is reflected from the smooth reflecting mirror surface as a beam of light 202 which is essentially equal to the incident light beam 201 and at an acute angle PHI ($\phi$) equal to the angle of incidence.

Figure 2C:
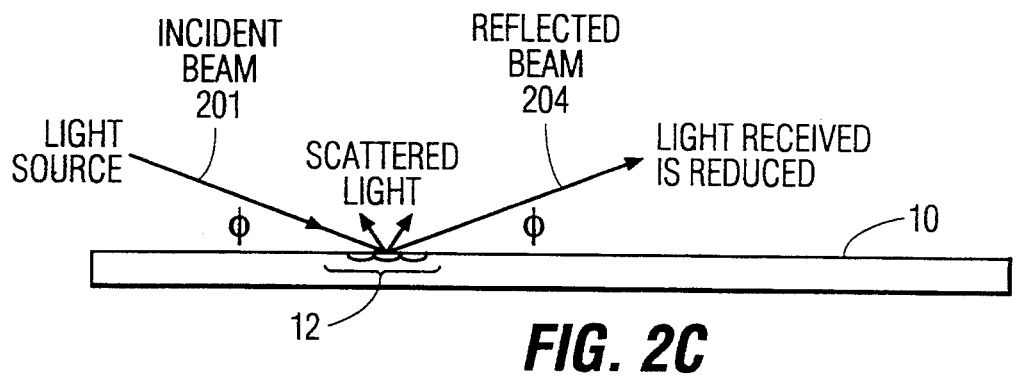

FIG. 2C shows that a light beam 201 incident at an angle on a portion of the surface which has been "damaged" undergoes scattering and reflection. The significant point of FIG. 2C (and FIG. 2A) is Applicants' recognition that when there is damage to the wafer surface the amount of light 204 reflected from the damaged area 12 on surface 10 with an angle PHI, or close to PHI, is recognizably less (i.e., substantially attenuated) than the amount of incident light 201.

Thus, there is a significant difference between the amount of sensed light reflected from an area on the surface which is "damaged" or contains a hole and an area which is "non-damaged". The difference in reflecting levels which may be termed "contrast", enables the recognition of the presence of the dot or hole formed at a spot on the wafer surface. Applicants recognized this basic principle and then proceeded to develop means for illuminating the data bars of bar codes (having relatively high reflectivity) at an acute angle to enhance the contrast between the data and the surrounding surface and to sense the light reflected at this acute angle, as further discussed below.

Figure 3:
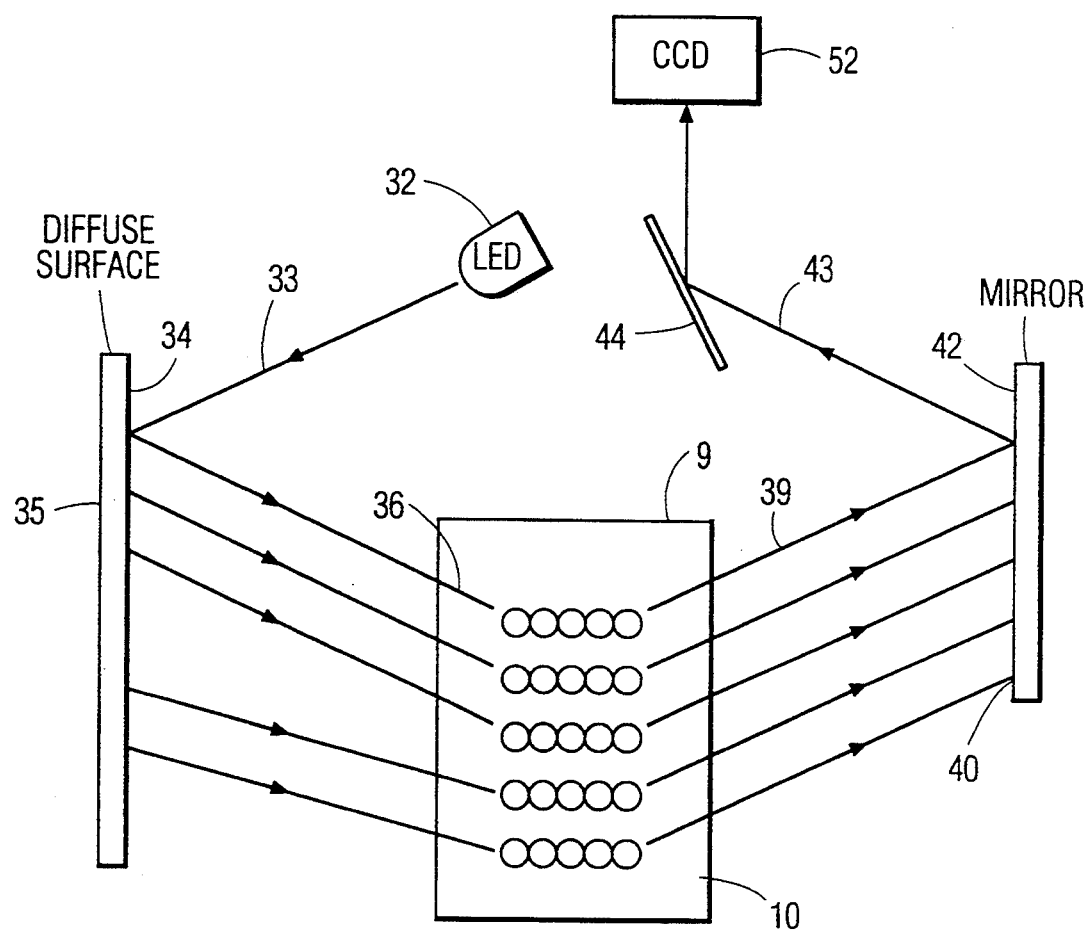
FIG. 3 is a schematic representation of an arrangement embodying the invention for projecting a beam of light onto a silicon wafer and for sensing the reflected light.

FIG. 3 shows an LED array 32 whose light output 33 is directed onto a surface 34 of a reflector 35 which functions to diffuse the light beam 33 emitted by LED array 32 and to provide a uniformly distributed diffused beam 36 of light onto the surface 10 of a silicon wafer 9. The wafer and the bar code on the wafer are oriented such that the light beam 36 is directed longitudinally (i.e., along the length of the data bars of the bar code, rather than transversely) to the direction of the data bars of the bar code. The reasons for this feature as well as the choice of angle will be further detailed below.

The light is projected longitudinally and at a relatively shallow (acute) angle relative to the plane in which the bar code is formed. The illumination angle PHI ($\phi$) is selected to be shallow, normally less than 45 degrees, and the angle of reflection PHI ($\phi$) will likewise be the same shallow angle. A significant portion of the incident light (36) falling on the data bars will be scattered and the remainder will be reflected at an angle PHI, equal to the angle of the incident light, towards a mirror 42. Simultaneously, virtually all the incident light (36) falling on the space not covered by data bars will be reflected at an angle PHI, equal to the angle of the incident light, towards mirror 42. The light 39 reflected from the wafer surface is directed onto the surface 40 of a mirror 42. The light 43 reflected from mirror 42 is directed onto the surface of a mirror 44 which then directs the received light, directly or via a series of lenses (not shown), onto a CCD array 52 which in conjunction with additional circuitry (not shown), functions to transform the light signals into electrical signals corresponding to the bar code data. Thus, the system is designed to view the light reflected from the wafer surface at an angle equal to the angle of the incident light beam.

Figure 4:
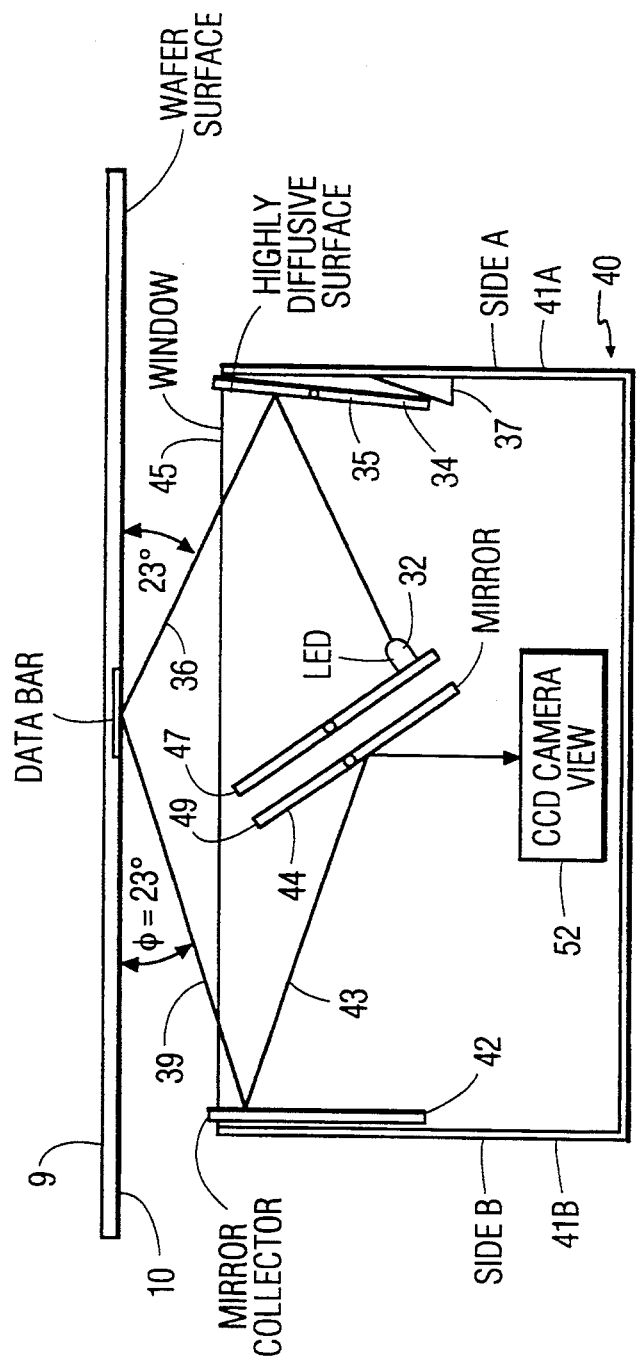
FIG. 4 is a cut away view of part of a barcode scanner (reader) housing embodying the invention.

FIG. 4 illustrates a layout for the components shown in FIG. 3 placed within a scanner housing 40 having side walls 41A and 41B and a front window 45. The light source, LED 32, which may be a single light element or an array of light elements, is mounted on an adjustable bracket 47 whereby the LED 32 light output can be directed onto the surface 34 of a diffusor 35 at a desired and controlled angle. The diffusor 35 is mounted on side 41A of housing 40 by means of an adjustable bracket (or wedge) 37 whereby the angle of the light output from diffusor 35 can also be adjusted, independently of the adjustment of bracket 47. The uniformly diffused light beam 36 reflected from the surface 34 of diffusor 35 is directed onto the surface 10 of wafer 9 through window 45 and forms an angle PHI ($\phi$) which is typically less than 45 degrees relative to the plane of the bar code formed on the surface 10 of wafer 9. In the particular embodiment shown in FIG. 4 the viewing angle (i.e., the angle of reflection) and the angle of incidence were each selected to be 23 degrees.

The light 39 reflected from the wafer surface 10 and the bar code formed thereon is directed to a mirror 42 mounted to the inside wall 41B of housing 40. The light 43 reflected from the surface of mirror 42 is directed onto a mirror 44. Mirror 44 is mounted on an adjustable bracket 49 to adjust the view of the CCD array 52 in order to control the viewing angle of the CCD and to set the optimum position of the CCD's focal point. Light striking mirror 44 is directed via conventional lens means (not shown) onto a charge coupled device (CCD) array 52 mounted within the housing; where CCD 52 is part of a viewing and signal processing system. The signals sensed by the CCD array are processed and decoded by means which are generally known, and are therefore not detailed. Brackets 47 and 49 may be combined to form a single bracket with the combined bracket being used primarily to control the viewing angle of the CCD array.

Figure 5A:
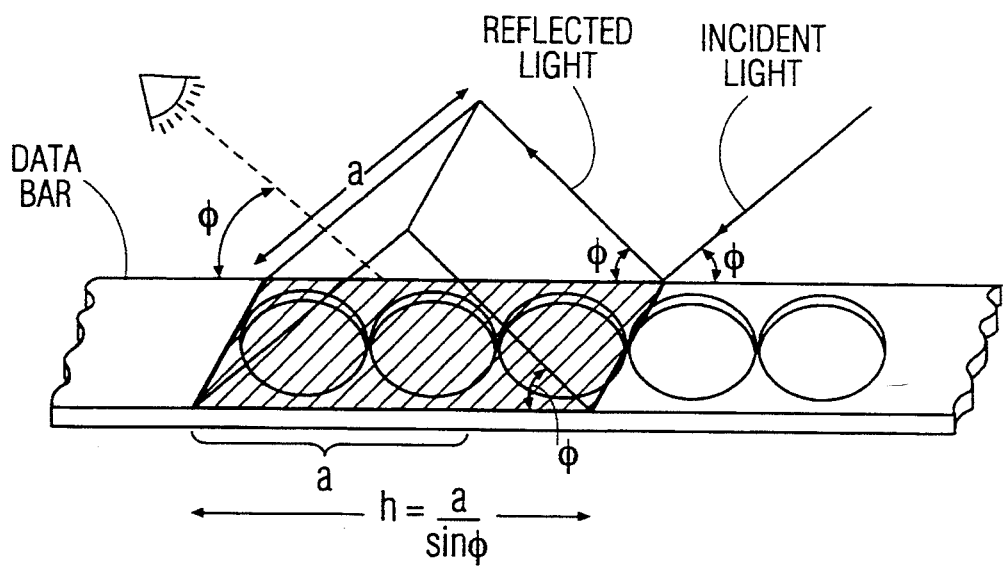
FIGS. 5A and 5B are diagrams illustrating, respectively, that a "greater" area is seen when viewed at an angle rather than when viewed perpendicularly.
Figure 5B:
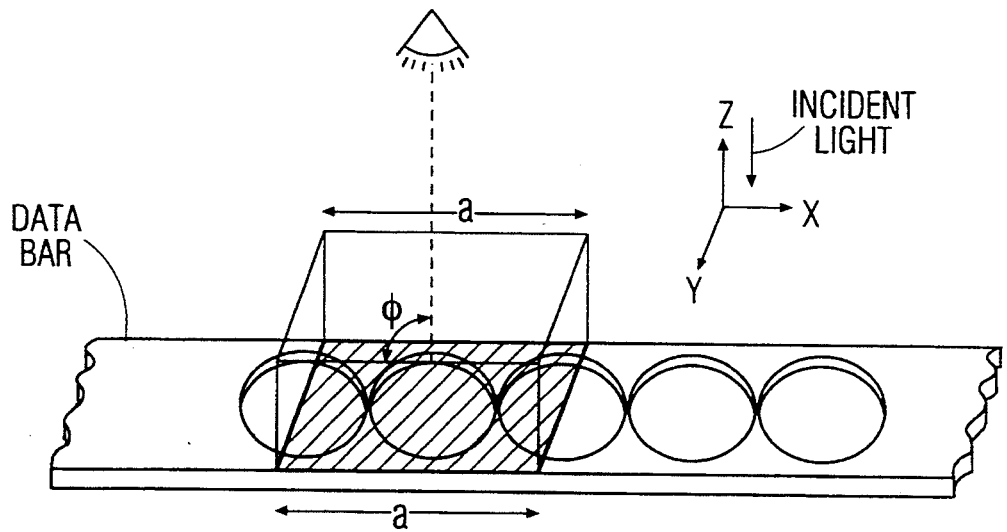

As shown in FIG. 5, by viewing the bar code at an acute angle PHI ($\phi$) the area of the bar code viewed by the camera system 52 is increased. Analysis of the viewing projection indicates that where the light is incident on the bar code at an angle PHI ($\phi$) and the viewing angle of the CCD camera 52 is selected to collect the light reflected at the same angle PHI ($\phi$), then the area viewed by the camera 52 is increased by $1/[\sin \phi]$. It should also be appreciated that, as illustrated in FIG. 5, viewing the data bar along its length functions to integrate (spatially average) the underlying pattern of "holes" to produce more accurate information. That is the "irregular" contour of the data bars is integrated to provide more uniform reading. It should be appreciated that this technique (i.e. viewing at an acute angle) may therefore be used to more accurately read non-uniform bar code data formed on any surface (reflective or non-reflective); where the "bars" of the bar codes are formed with very ragged edges and/or significant non-uniform widths along their lengths.

It should also be noted that the viewing angle may be set independently and to be different from the angle light is incident on the bar code. However, it is generally preferable that the viewing angle be the same as the angle of light incident on the surface.

Figure 6:
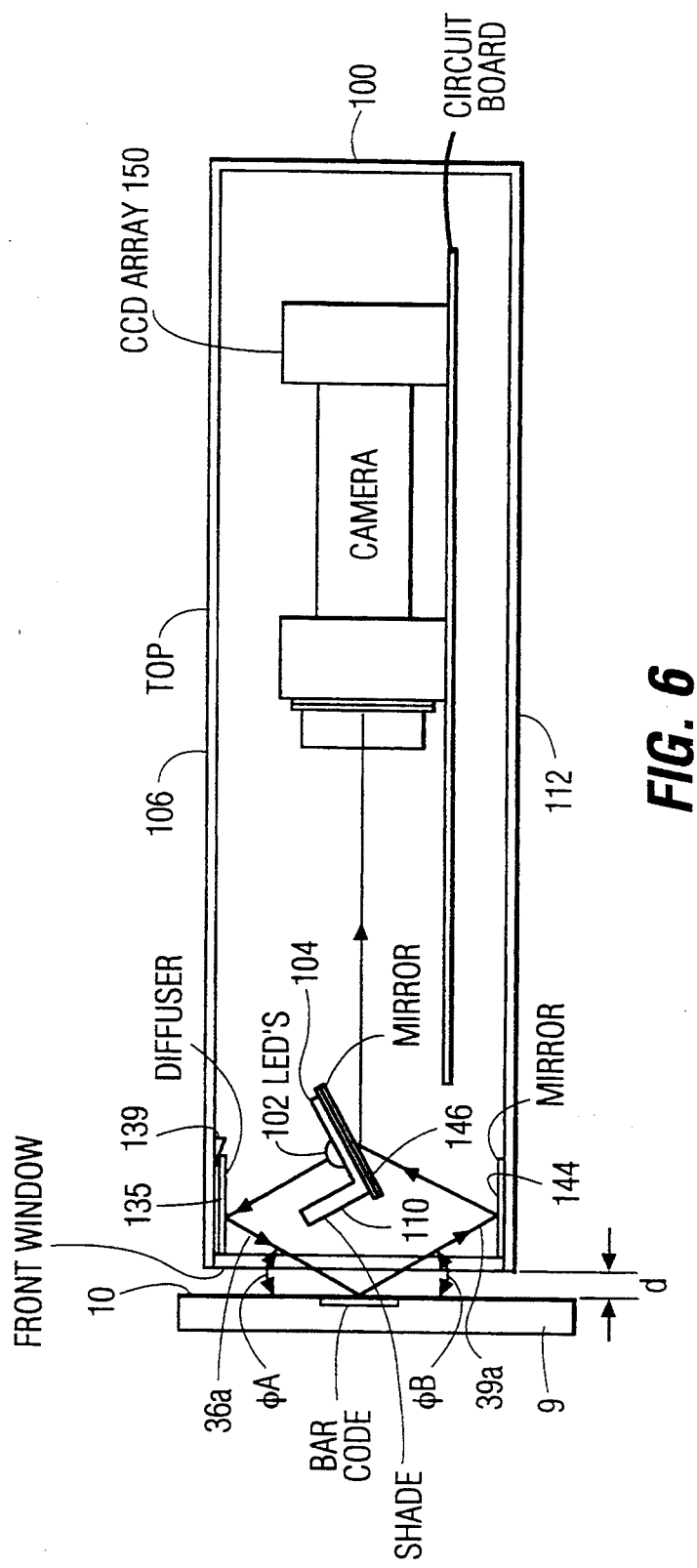
FIG. 6 is a side view of a bar code reader embodying the invention.

Referring to FIG. 6 there is shown the cross-section of a bar code reader suitable to read bar codes formed on silicon wafers. The reader includes a case or housing 100 in which is mounted a light source 102 which in this particular embodiment is an array 102 of light emitting diodes (LED's). The LED array 102 is mounted on an adjustable arm 104 to enable the angle of the light directed from the light source to be varied. The light from light source 102 is directed onto a diffusive surface 135 which functions to reflect a uniformly diffused light in the same manner as the diffusor 35 discussed above. Reflector 135 is mounted via a connecting wedge 139 to the top side 106 of case 100. The connecting wedge 139 enables the angle of the light directed outward from reflector 135 to be adjusted to provide appropriate control of the angle of the beam of light directed onto a bar code located on the surface 10 of a silicon wafer 9.

The front of the case 100 may be a piece of glass or any appropriate window which allows the light from the LED 102 to pass through with little impediment and which allows the reflected light 39a to pass through unimpeded onto a mirror 144. Mirror 144 is mounted on the side 112 of case 100.

A light blocking element 110 is mounted on arm 104 to prevent light emanating from LED array 102 to directly impinge on the wafer surface. Consequently only the light emitted from light source 102 which is directed onto the surface of reflector 135 and from which it is redirected at an acute angle impinges on the surface 10 of wafer 9. The angle ($\phi$A) of the light beam 36a incident on the wafer surface is therefore controlled and acute and is reflected back as light beam 39a at the same angle ($\phi$B) for an undamaged surface onto a mirror 144 located on the bottom side 112 of case 100.

Light from mirror 144 is reflected onto a mirror 146 mounted on arm 104 for controlling the rotation and position of mirror 146 to obtain a desired amount of light onto the photosensor array 150. In the embodiment of FIG. 6, the photosensor array 150 may be a charge coupled device (CCD) such as the CCD array 52 of FIGS. 3 and 4, or any other suitable photosensing means.

As shown in FIG. 6, the bar code reader may be positioned a distance "d" from a wafer 9 whose bar code is to be read.

The acute angle "$\phi$A" which the light beam 36a makes with the surface 10 of wafer 9 is preferably less than 45 degrees. Note that for an undamaged surface, the angle of incidence $\phi$A is equal to the angle of reflection $\phi$B. To project the beam 36a at different angles the adjustable bracket (wedge) 139 is used. In addition, the position of mirror 146 may be adjusted by means of arm 104 to ensure that the desired received light signals are coupled onto the CCD array 150.

Where the angle of incidence $\phi$A of light beam 36a is set at 30 degrees a single adjustable means (rather than two) may be used to ensure that the reflected light is directed onto photosensor 150.

Figure 7:
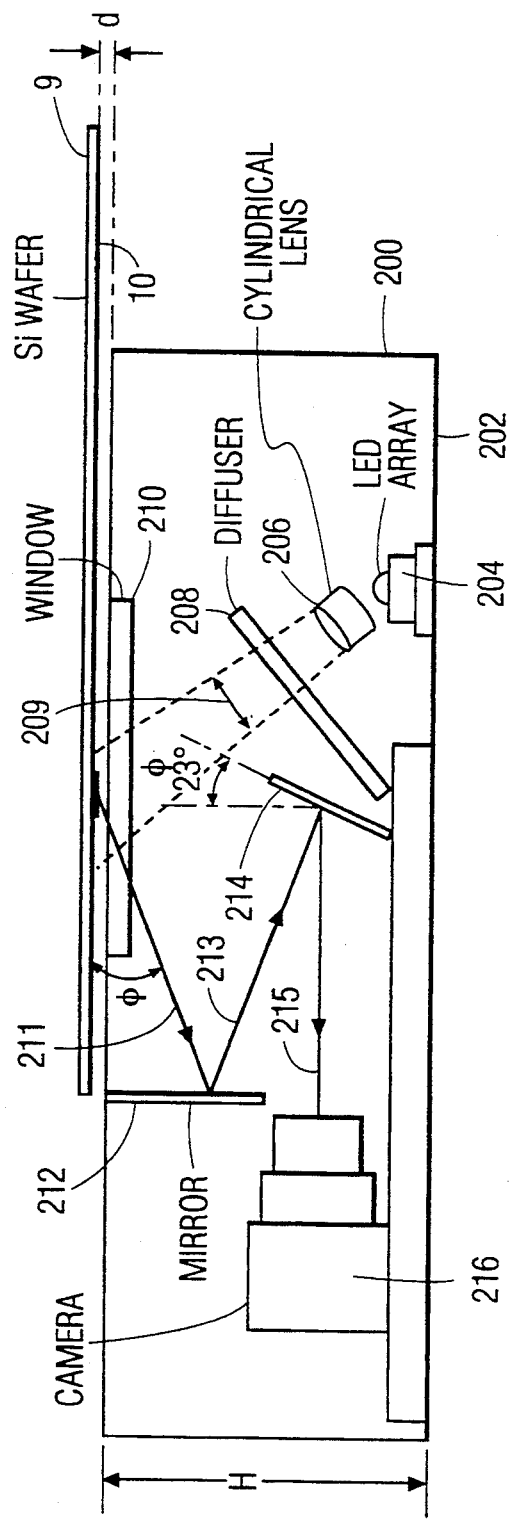
FIG. 7 is a schematic representation of another arrangement embodying the invention.

FIG. 7 shows a bar code reader 200 having a base 202 on which is mounted a light source 204 which may be an LED array such as light source 32, or 102, or any other suitable light source. A cylindrical lens 206 is mounted between the light source 204 and a diffuser 208. The cylindrical lens 206 and the diffuser 208 function to convert the light emanating from light source 204 into a uniformly diffused beam of light 209 directed outward via aperture or window 210 onto the surface 10 of an object 9, which may be a silicon wafer or any other component having a reflective surface. A light beam 211 reflected from the surface 10 is directed onto a first mirror 212 from which it is reflected onto a second mirror 214 which is adjustable to project the desired light 213 coming from mirror 212 at a desired angle for viewing into the camera 216.

The bar code reader of FIG. 7 may be used, and is useful, in applications where space perpendicular to the surface containing the bar code is limited. Referring to FIG. 7 observe that the optical path defined by 211, 213 and 215 is designed to minimize the package height (H) and provide the optimum acute angle $\phi$ (e.g., in the design shown 23 degrees was found to be the optimum focal point). The optical path includes a first reflective surface (212) mounted perpendicular to window (210) and a 2nd reflective surface (214) whose angle PHI ($\phi$) with respect to the normal to the camera's axis defines the angle PHI ($\phi$) which corresponds to the viewing angle of optical system. The second reflective surface (214) may be rotated about the vertical to select angle PHI ($\phi$). Moving the camera 216 to the side of the housing allows the bar code to be packaged more compactly in the vertical direction. The system of FIG. 7 includes a diffused light source including a cylindrical lens 206 and transmissive diffuser 208 to create and direct a uniform light beam 209 at the desired angle. The design shown includes a separate cylindrical lens (206) and transmissive diffuser (208) element. It is understood that these two elements could be combined into a single diffusive (foggy) cylindrical lens element to provide the equivalent function. It is also understood that in some cases a toroidal lens may be preferable and be used instead of the cylindrical case.

Figure 8A:
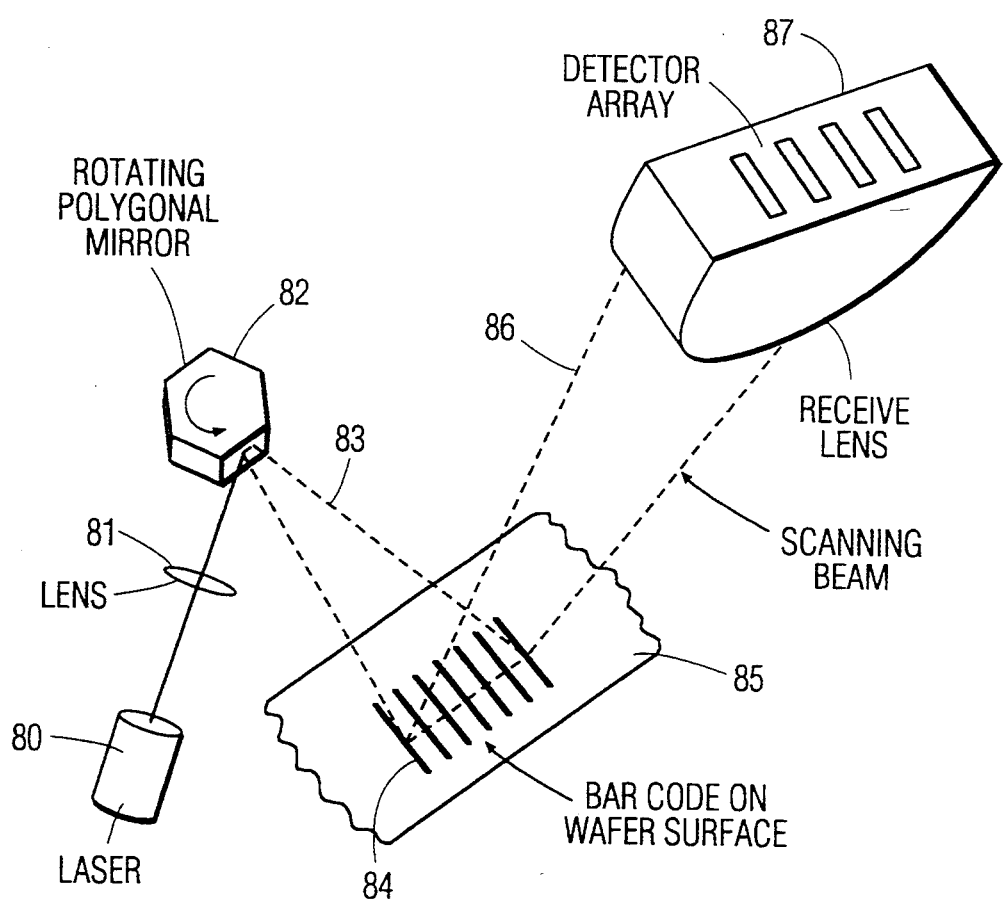
FIGS. 8A and 8B depict a laser light source arrangement embodying the invention.
Figure 8B:
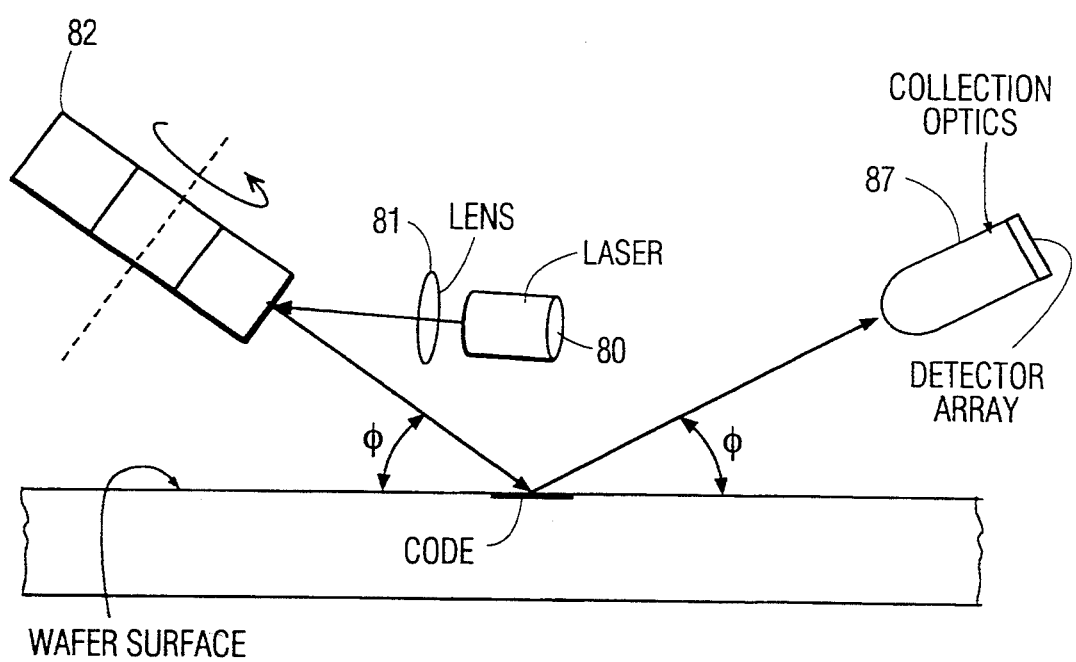
Figure 9:
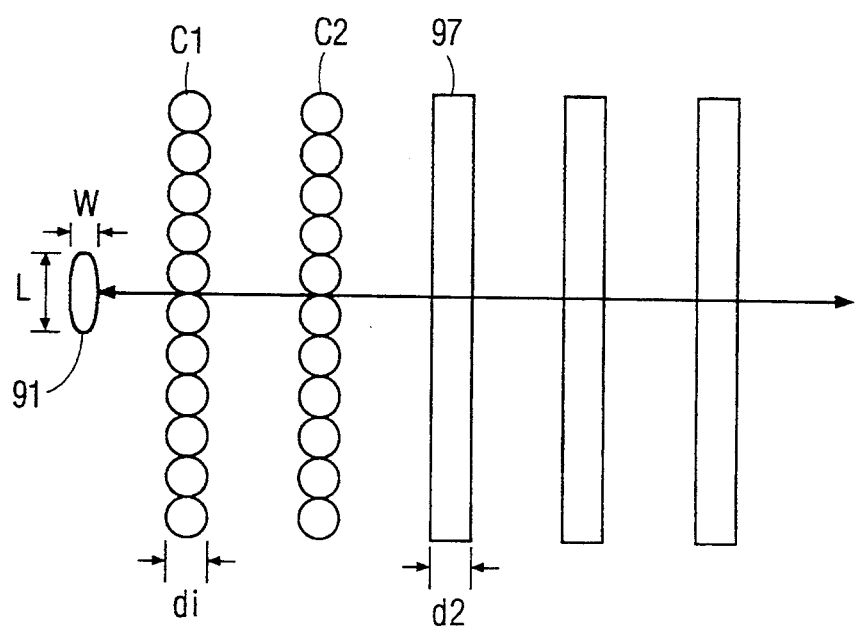
FIG. 9 is a diagram of a laser light spot for use in the arrangement of FIGS. 8A & 8B.

Referring to FIGS. 8A and 8B there is shown the use of a laser beam 83 to scan a bar code 84 at an acute angle (PHI) relative to the plane in which the bar code is formed where the angle PHI is preferably less than 45 degrees when measured relative to the bar code surface. A light source 80, which is preferably a laser light source is focused by means of a lens system 81 onto a rotating polygon 82 which produces a laser light beam 83 which is used to sweep across a bar code 84 formed on the surface 85 of a semiconductor wafer or any other surface, reflective or non-reflective (note that the rotating polygon is used for purpose of example and any other suitable scanning or vibrating means could be used instead). The bar code 84 may comprise data bars of the type discussed above or may include any other type of known bar code comprising different arrangements of parallel bars of the same or different widths. Where the bar code consists of data bars of the type shown in FIGS. 1B and 1C, as discussed above, the light beam 83 reflected from the rotating polygon 82 and incident on the bar code 84 is designed to be oblong and have the form of an ellipse 91 as shown in FIG. 9, when it sweeps across the bar code in a direction transverse to the length of the bar code. The ellipse 91, also referred to herein as the laser light spot, is shaped such that its length (L) is greater than the diameter (di) of a "hole" along the length of the data bar. The width (W) of the spot 91 incident on the bar code is designed to be less than the width of the data bar (i.e., diameter (di) of any hole). The laser light spot 91 impinges on the surface of the bar code 84 at an acute angle PHI. Note that the laser light source 80 produces a circle of light which when shaped by the lens system 81 and projected at an angle results in the projection of the laser light spot 91 as shown in FIG. 9. In general, the laser light spot is designed to have a length (L) which is greater than some minimum value to capture a predetermined length of the data bar to be read and a width which is less than the narrowest data bar width in order to be able to resolve the bar code. Referring to FIG. 9 note that where the data bars are rectangular bars of width d2 as shown for bar 97, then the width (W) of the laser spot size 91, is made less than d2, while the length (L) of spot 91 is several times greater. The light 86 reflected at an angle PHI, equal to the angle of incidence from the bar code, is detected by a photodetector or photodetector array 87.

The system of FIGS. 8A and 8B can provide improved contrast to the usual perpendicular or nearly perpendicular beam projection and sensing. Since the incident beam is projected at an acute angle (PHI) and since the angle of reflection is equal to the angle of incidence relative to the wafer surface on which the bar code is formed, only a light spot hitting an undamaged space will be reflected into the receiver 87. A laser light spot falling on a data bar (i.e., a damaged space on the surface of the wafer) will be scattered or deflected and will not produce a reflection at the receiving angle of the receiver optics. Clearly, projecting and viewing the laser spot at an acute angle increases the contrast and provides spatial integration of the area being scanned. Consequently, a laser light source can be very useful to read bar code data where the data bars have an irregular shape and/or where these non-uniform data bars are formed on a highly reflective surface.

The invention has been illustrated with bar code data formed on highly reflective surfaces. However, it should be appreciated that this is only one example of the application of the principle of acute direct reflection (illumination at an angle of less than 90 degrees and detection at an equal or similar angle). That is, the principle of acute direct reflection is applicable any time there is a physical discontinuity between bars and spaces that produces a variation in the amount of light directly reflected from bars and spaces when illuminated from an acute angle that is not apparent when illuminated from a normal angle. Thus, in general, the invention is applicable to read a bar code formed on a surface which is reflective or uniformly diffuse (matte).

Barcode readers embodying the invention can be used to read flat, matte, wafers as well as highly reflective wafers. Although much of the light incident on a matte surface wafer is randomly scattered, a significant percentage of incident light is reflected at an equal angle to the angle of incidence. Light incident on a matte surface wafer in a normal direction is reflected at relatively the same amount on the bar code bars and spaces. An acute angle of illumination and detection produces a usable contrast between bars and spaces. Due to the bars being formed of multiple, discontinuous, physical depressions in the wafer surface, more light is scattered by the bars than the spaces. In concept this is similar to a highly reflective wafer surface, the only difference being the smaller amount and lower ratio of bar reflection to space reflection.

In the FIGURES a diffuser is shown to render the incident light emitted by an array of LED's to be more uniform. However, it should be appreciated that the use of a diffusing panel or lens is only necessary when using a multi-point light source on a reflective surface. If a single point source is used (e.g., a single LED rather than an array), the diffuser may not be needed. Also, on matte surfaces a diffuser may not be needed.

A reflective/diffusive panel for illumination and a reflective panel for detection, as shown in FIGURES are required only for packaging considerations. A scanner can easily be built without either of these parts. That is, a camera or photosensor receiving the reflected light at angle PHI could be substituted, for example, for the mirror 36 in FIG. 3, mirror 52 in FIG. 4, mirror 144 in FIG. 6 and mirror 212 in FIG. 7.

The invention is applicable to systems in which the bar code and the bar code reader are held stationary relative to each other, or in which the bar code reader moves or scans across the bar code, or in which the bar code reader is held stationary and the bar code (and/or the surface or wafer on which the bar code is formed) is moved. In the latter system the bar code reader emits a single spot of light focused at a given point in space and requires but a single light sensor. In accordance with the invention the light would be emitted and projected (angled) such that the incident light defines an acute angle PHI relative to the plane through which the bar code is intended to pass and the light sensor would be designed to collect or sense the light reflected at the same acute angle PHI from the given point on which the emitted light is focused. Thus, the invention is also applicable to a fixed position scanner for sensing a moving wafer or bar code.

What is claimed is:

1. A bar code reader for sensing light reflected from a bar code formed on a surface which is external to the bar code reader, wherein the bar code includes data bars, each data bar having a predetermined length and width associated therewith, with the length of each data bar being greater than its width, comprising:

a light source;

a light source collecting and projecting means including a cylindrical lens and diffusive element for receiving the light from said light source and producing a uniform light beam and for projecting said uniform light beam at an acute angle, simultaneously onto and across all the data bars of said bar code and along the length of each data bar, said acute angle being substantially less than ninety (90) degrees with respect to the surface on which said bar code is formed;

a photosensor;

a light reflective means for simultaneously viewing the light reflected from all the data bars of the bar code at an acute angle with respect to the plane in which the bar code is formed and for directing the received light onto said photosensor, said means for viewing the light reflected from all the data bars including means for simultaneously viewing the light reflected along the length of all the data bars at an acute angle which is equal to and opposite to the angle at which the projected light is incident on the bar code; and wherein the simultaneous illumination of all the bars of said bar code enable light reflected from the entire bar code to be sensed simultaneously while the bar code reader is stationary relative to the bar code.

2. The bar code reader of claim 1 wherein the surface on which the bar code is formed is a highly reflective surface.

3. The bar code reader of claim 2 wherein said photosensor is a charge coupled device (CCD) array.

4. The bar code reader of claim 2 wherein said means for projecting a beam of light onto said reflective surface includes said cylindrical lens and diffusive element positioned between said light source and said bar code.

5. The bar code reader of claim 2 wherein said bar code includes a plurality of data bars, each data bar being formed by a series of holes of predetermined diameter defining a column; and wherein said means for producing a light beam includes means for projecting said light beam along said columns.

6. The bar code reader of claim 1 wherein said highly reflective surface is the surface of a semiconductor wafer.

7. The bar code reader of claim 1 wherein said acute angle is less than 45 degrees.

8. A bar code reader for sensing light reflected from a bar code formed on a surface which is external to the bar code reader, wherein the bar code includes data bars, each data bar having a predetermined length and width associated therewith, with the length of each data bar being greater than its width, comprising:

a housing having a front end and a back end, and first and second sides located on either side of said front end and extending between said front and back ends in a generally perpendicular direction to said front end, said front end being adapted for the emission therethrough of a light beam and for the receipt therethrough of light reflected from a bar code illuminated by said light beam;

a light source located within said housing;

a light collecting and projecting means including a cylindrical lens and a diffusive element mounted within said housing and located so as to receive light from said light source and produce a uniform light beam and for simultaneously projecting the light beam at an acute angle onto and across all the data bars of a bar code located externally to the housing, for simultaneously illuminating an entire bar code; the acute angle being less than ninety (90) degrees with respect to the surface on which the bar code is formed; said light projecting means being arranged to simultaneously project light at said acute angle along the length of all the data bars;

a photosensor located within said housing; and a reflective means mounted within said housing for simultaneously viewing the light reflected from said entire bar code, along the length of all the data bars of said bar code, at an acute angle which is opposite to the angle of the light projected onto the bar code and including means for directing the viewed reflection onto said photosensor.

9. The bar code reader of claim 8, wherein said light source is mounted on the back end of said housing and wherein said cylindrical lens and said diffusive element are mounted intermediate said light source and the front end of said housing.

10. The bar code reader of claim 9 wherein the light source, cylindrical lens and diffusive elements are arranged to project light at an acute angle relative to the plane in which the bar code is formed; and wherein the reflective means for viewing the reflected light includes mirror means positioned to capture light reflected from the bar code at an angle away from the angle of incident light, the angle of reflection being opposite the angle of incident light and said mirror means being arranged to direct the reflected light onto said photosensor.

11. The bar code reader of claim 10 wherein the mirror means includes two mirrors.

12. The bar code reader of claim 9, wherein the light is projected from and along one side of said housing and the reflected light is viewed from and along the other side of said housing.

* * * * *